United States Patent [19]
Lee

[11] Patent Number: 5,373,319
[45] Date of Patent: Dec. 13, 1994

[54] OBJECT TRACKING DEVICE FOR A CAMCORDER

[75] Inventor: Nam Su Lee, Suwon, Rep. of Korea

[73] Assignee: Gold Star Co., Ltd., Seoul, Rep. of Korea

[21] Appl. No.: 136,736

[22] Filed: Oct. 14, 1993

Related U.S. Application Data

[63] Continuation of Ser. No. 873,210, Apr. 24, 1992, abandoned.

[30] Foreign Application Priority Data

Apr. 29, 1991 [KR] Rep. of Korea .................. 91-6888

[51] Int. Cl.$^5$ ............................................. H04N 7/18
[52] U.S. Cl. ..................................... 348/143; 348/169
[58] Field of Search ............... 358/229, 105, 108, 107, 358/125, 126; 318/640, 600, 601, 625; 356/28; 348/373, 374, 375, 143, 169, 152, 154, 155, 214; H04N 5/225

[56] References Cited
U.S. PATENT DOCUMENTS

| | | | |
|---|---|---|---|
| 3,598,344 | 8/1971 | Walters et al. | 244/3.11 |
| 3,790,277 | 2/1974 | Hogan | 356/152 |
| 4,527,894 | 7/1985 | Goede et al. | 356/28 |
| 4,905,315 | 2/1990 | Solari et al. | 318/640 |
| 5,231,483 | 7/1993 | Sieber et al. | 358/125 |

Primary Examiner—Joseph Mancuso
Assistant Examiner—Tuan V. Ho
Attorney, Agent, or Firm—Keck, Mahin & Cate

[57] ABSTRACT

An object tracking apparatus for a camcorder which automatically controls the photographing direction in the camcorder according to the movement of the object so that the camcorder can automatically track and photograph the object. The object tracking apparatus for a camcorder comprises supporting means for supporting the camcorder to be panned right and left, a motor for supplying a power such that the supporting device rotates the camcorder right and left, a motor driver for driving a motor, at least a pair of photosensitive means mounted on the front surface of camcorder for detecting the left and right movements of the object, and a comparing means for controlling the motor driver according to the change of the output signals of the photosensitive means.

9 Claims, 6 Drawing Sheets

OBJECT TRACKING DEVICE FOR A CAMCORDER

This is a continuation of application Ser. No. 07/873,210, filed Apr. 24, 1992 now abandoned.

BACKGROUND OF THE INVENTION

The present invention relates generally to a camcorder supporting apparatus provided with an object tracking device, and more particularly to an object tracking device which can control a photographing direction in a camcorder according to the movement of the object so that the camcorder can automatically track and photograph the object.

Generally, a camcorder, which is a VCR (Video Cassette Recorder) united with a camera, encodes an image of an object into a video signal and records the encoded video signal on a recording medium such as a video cassette tape. The camcorder is rotatably supported by a tripod-shaped supporting apparatus such that it moves up and down or right and left, around the crosspoint of incident light received by the camcorder.

The camcorder supporting apparatus conventionally was adapted to change the photographing direction in a camcorder to the desired direction by the user's operation. This caused the user inconvenience in that he should operate the camcorder supporting apparatus in order to change the photographing direction in the camcorder whenever the object being photographed moves.

A conventional camcorder supporting apparatus will be described with reference to the accompanying FIGS. 1 to 5.

FIG. 1 is a longitudinal sectional view of a conventional supporting apparatus when a horizontal movement portion is driven, while FIG. 2 is a longitudinal sectional view of a conventional supporting apparatus when a vertical movement portion is driven. As shown in FIGS. 1 and 2, the conventional supporting apparatus comprises a housing 1 which is rotatably mounted on the upper portion of a tripod supporting axis 9 to move it around the tripod supporting axis 9. The housing 1 comprises vertical bevel gears 11 and 12 respectively provided inside both opposite side walls of the housing 1, and a horizontal bevel gear 7 fixed on the lower surface of the housing 1 to engage with the vertical bevel gears 11 and 12. The central portion of the horizontal bevel gear 7 is combined with the tripod supporting axis 9, so that the horizontal bevel gear 7 with the tripod supporting axis 9 and the housing 1 rotates around the tripod supporting axis 9 as the vertical bevel gears 11 and 12 rotate. The vertical bevel gear 11 is rotated by a handle 10 which is passed through an outside wall of the housing 1 and fixed on its central portion. Also, the conventional supporting apparatus comprises a vertical support member 13 fixed by a connector 14 on the side wall provided with the vertical bevel gear 12. The vertical support member 13 comprises a semicylinder-shaped concave formed on its upper portion and a vertical movement gear 2 installed within itself whose circumferential teeth are protruded over the semicylinder-shaped concave. The semicylinder-shaped concave of the vertical supporter 13 receives the vertical movement portion 5 to be rotatable forwardly and backwardly. The vertical movement portion 5 comprises a movement connecting gear 15 mounted within itself to be engaged with the vertical movement gear 2.

Further, the vertical movement portion 5 supports a fixing plate 4 connected by a hinge 6. The fixing plate 4 pivotably moves up and down around the axis of hinge and has a fixing bolt 3 mounted in its central portion. The fixing bolt 3 serves to fix the camcorder on the upper surface of the fixing plate 4. The movement connecting gear 15 moves the vertical movement portion 5 forwardly and backwardly according to the rotation of the vertical movement gear 2.

Moreover, the conventional supporting apparatus additionally comprises a motor case 8 inserted into the housing. The motor case 8 includes a motor 18 mounted to be movable horizontally along a guider 22 formed on its bottom. The motor 18 comprises a solenoid 16 mounted on the opposite side to the vertical bevel gear 11 and a rotational axis 17 mounted on the opposite side to the vertical bevel gear 12. As shown in FIG. 4, th rotational axis 17 includes first and second concaves 17a and 17b. The first concave 17a is disposed at the axial hole of the vertical movement gear 2 to separate the rotational axis 17 from the vertical movement gear 2 when the rotational axis 17 rotates the vertical bevel gear 12. On the other hand, the second concave 17b is disposed at the axial hole of the vertical bevel gear 12 to separate the rotational axis 17 from the vertical bevel gear 12 when the rotational axis 17 rotates the vertical movement gear 2. Also, the conventional supporting apparatus additionally comprises a power line 2 for supplying a driving voltage to the motor 18 and a power line 21' for supplying a driving voltage to the solenoid 16. The power lines 21 and 21' are connected to a remote controller 20 for driving the motor 18 and the solenoid 16.

FIG. 5 is a circuit diagram of the remote controller 20 for controlling the motor 18 and the solenoid 16. With reference to FIG. 5, the remote controller 20 comprises a first selection switch SW1 connected in series to the solenoid 16 between the first supply power Vcc and the second power source GND. And the remote controller 20 comprises two resistors R1 and R2 and a second selection switch SW2 connected in series between the first power source Vcc and the second power source GND. The connection P1 between two resistors R1 and R2 is connected to the base of the transistor Q1 whose emitter and collector are connected to the first power source Vcc and the motor 18, respectively.

Also, the remote controller 20 additionally comprises a capacitor C1, a transistor Q2, and two resistors R3 and R4 constituting a motor controlling circuit for preventing the driving of the motor 18 when the solenoid 16 is initially operated.

Now, the operation of the conventional supporting apparatus shown in FIGS. 1 to 5 will be described in the cases of vertical movement and horizontal movement. First, in the case of vertical movement of the supporting apparatus, the first selection switch SW1 is turned on by the user and supplies a driving voltage to the solenoid 16. The solenoid 16 is driven by the first power source Vcc supplied via the first selection switch SW1 and moves the motor 18 and the rotational axis 17 of the motor into the arrow direction shown in FIG. 2, thereby connecting the rotational axis 17 to the axial hole of the vertical movement gear 2 and simultaneously separating it from the vertical bevel gear. At this time, while the first concave 17a of the rotational axis 17 is deviated from the axial hole of the vertical movement gear 2, the second concave 17b of the rotational axis 17 is disposed at the axial hole of the vertical bevel gear 12.

When the rotational axis 17 of the motor 18 has been combined with the vertical movement gear 2, if the second selection switch SW2 is turned on by the user, then the motor 18 is driven by the first supply voltage Vcc supplied via the emitter and collector of the transistor Q1 to rotate the rotational axis 17 and the vertical movement gear 2. The vertical connection gear 15 engaged with the vertical movement gear 2 is rotated forward and backward according to the rotation of the vertical movement gear 2, thereby rotating the vertical movement portion 5 and the fixing plate 4 forward and backward. Meanwhile, since the vertical bevel gear 12 is separated from the rotational axis 17 of the motor 18, it does not rotate.

Secondly, in case of horizontal movement of the supporting apparatus, the first selection switch SW1 is turned off by the user to stop the supplied power to the solenoid 16. At this time, the rotational axis 17 of the motor 18 moves into the arrow direction shown in FIG. 1 to be connected to the axial hole of the vertical bevel gear 12 and to be separated from the vertical movement gear 2. In other words, while the first concave 17a of the rotational axis 17 is disposed at the axial hole of the vertical movement gear 2, the second concave 17b of the rotational axis 17 is separated from the axial hole of the vertical bevel gear 12.

When the rotational axis 17 of the motor 18 has been connected to the vertical bevel gear 12, if the second selection switch SW2 is turned on by the user, then the motor is driven by the driving voltage supplied from the first power source Vcc via the emitter and collector of the transistor Q1 to rotate the vertical bevel gear 12 with the rotational axis 17. The horizontal bevel gear 7 engaged with the vertical bevel gear 12 is rotated around the tripod supporting axis 9 with the housing 1 according to the rotation of the vertical bevel gear 12.

Accordingly, the photographing direction in the camcorder mounted on the fixing plate 4 is rotated up and down or right and left according to the rotation of the housing 1 and the vertical movement portion 5.

In FIG. 5, when the second selection switch SW2 is turned on, the transistor Q1 is turned on by the potential difference above the operational voltage between the emitter and the base of the transistor Q1, thereby supplying the driving voltage supplied from the first power source Vcc to the motor 18. Then, the motor 18 rotates the rotational axis 17 by the driving voltage supplied from the transistor Q1. Also, upon turning on the second selection switch SW2, if the first selection switch SW1 is turned on, then the solenoid 16 is operated to move the motor 18 and the rotational axis 17 and the transistor Q1 is turned off by a high potential supplied at its base through the resistors R4 and R2, thereby instantaneously stopping the operation of the motor 18. Herein, the stopped time of the motor 18 means such a time period that the charging voltage of the capacitor C1, whose charging is initiated from the turn-on of the first selection switch SW1, reaches the operation voltage of the transistor Q2. This charging time of the capacitor C1 is greater than the time needed for the movement of the rotational axis 17.

The above-mentioned conventional supporting apparatus has disadvantages in that the photographing direction in the camcorder should be panned up and down or left and right by user according to the movement of the object, and also the object in photographed image may deviate to the left or right side in the picture.

SUMMARY OF THE INVENTION

Accordingly, it is an object of the present invention to provide an object tracking apparatus for a camcorder, wherein the photographing direction in the camcorder is automaticially controlled according to the movement of the object so that the camcorder can automatically track and photograph the moving object.

To achieve this purpose, an object tracking apparatus according to the present invention comprises a pair of photosensitive elements for respectively detecting right and left movements of the object, a pair of comparing means for comparing outputs of the photosensitive elements with the respective predetermined reference values, a supporting means for supporting the camcorder rotatably, a motor for moving the supporting means left and right, and a motor driving means for driving the motor forward and backward according to the outputs from the pair of comparing means.

According to the above constitution, the object tracking apparatus of a camcorder detects the left and right movements of the object by a pair of photosensitive elements and drives the motor forward and backward according to the detected output, thereby controlling the photographing direction of the camcorder according to the moving direction of the object.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Figure 1:
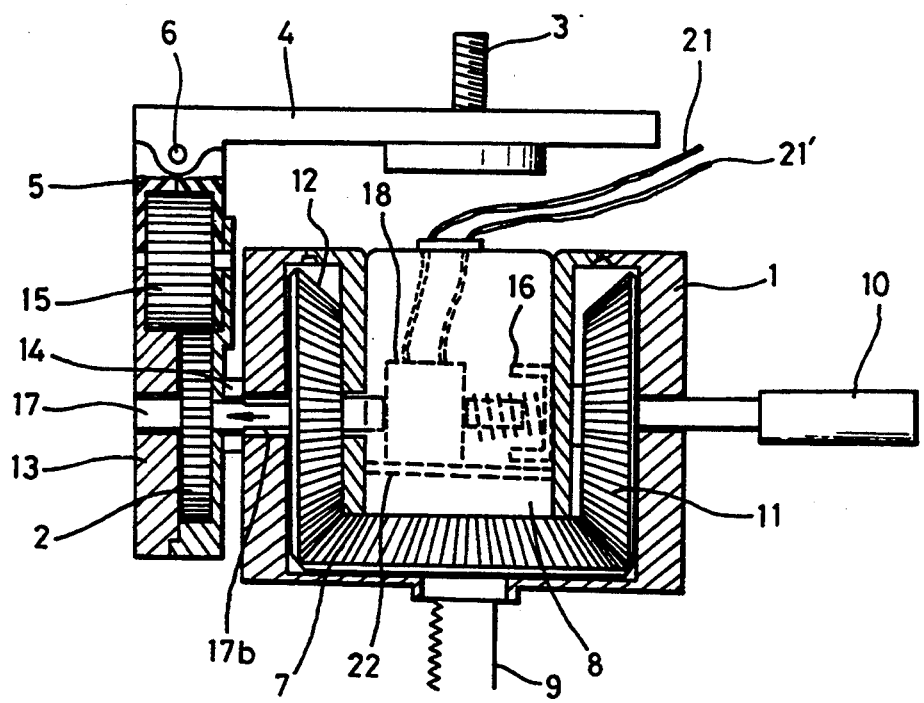
FIGS. 1 and 2 are longitudinal sectional views of a conventional camcorder apparatus.
Figure 3:
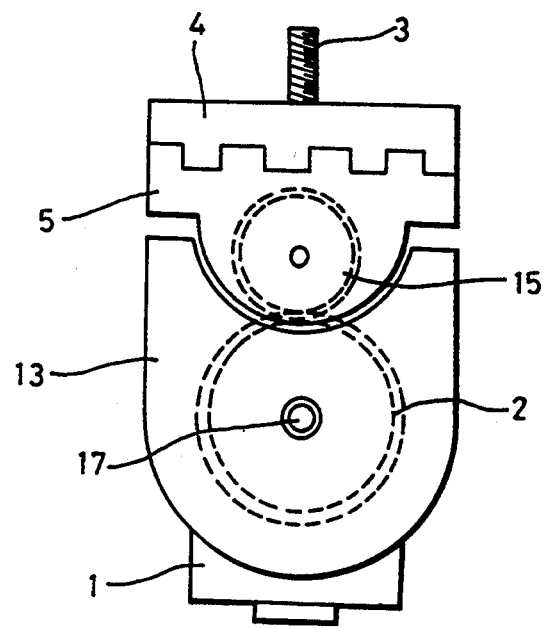
FIG. 3 is a left side view of a camcorder supporting apparatus illustrated in FIGS. 1 and 2.
Figure 2:
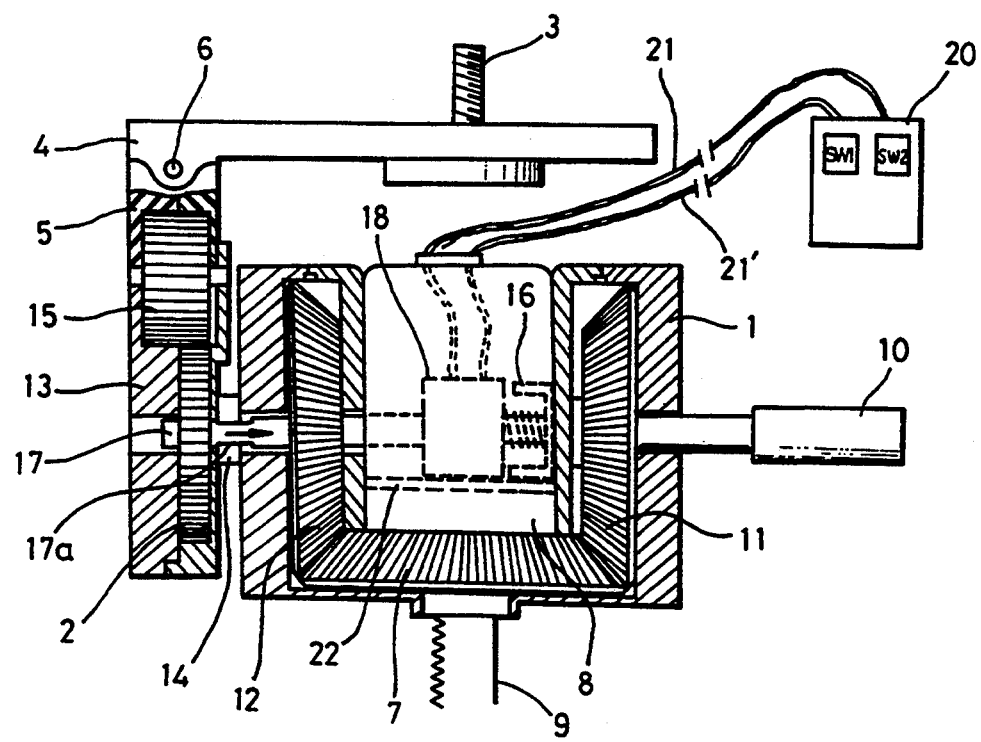
Figure 4:
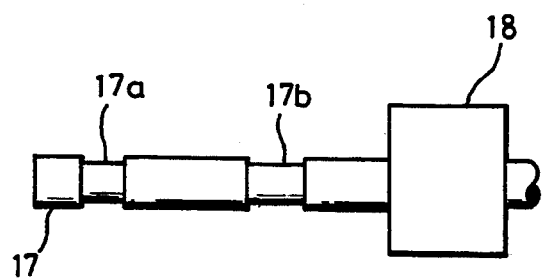
FIG. 4 is detailed diagram of a rotational axis shown in FIG. 1 and 2.
Figure 5:
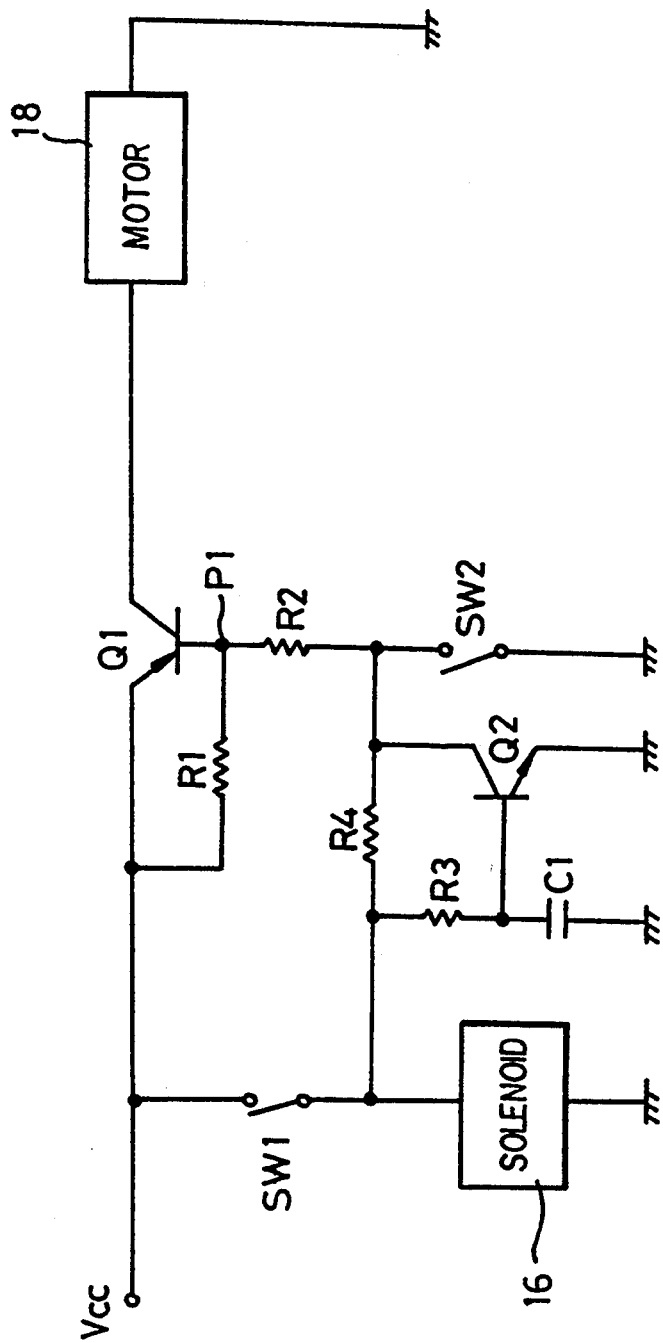
FIG. 5 is a circuit diagram of a remote controller shown in FIG. 1.
Figure 6:
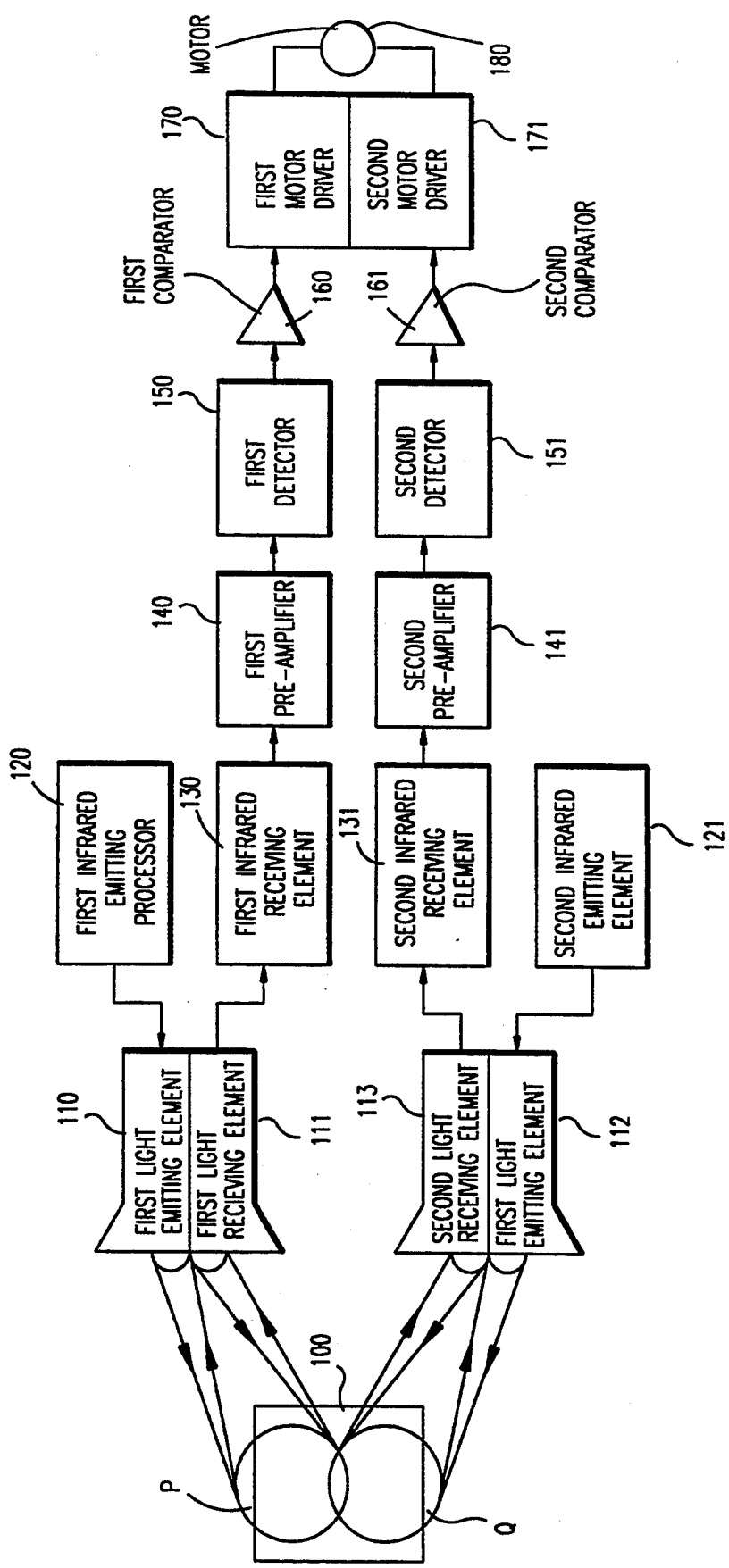
FIG. 6 is a block diagram of an object tracking apparatus of a camcorder according to an embodiment of the present invention.

FIG. 6 is a block diagram of an object tracking apparatus for a camcorder according to an embodiment of the present invention, which comprises a pair of light emitting elements 110 and 112 and a pair of light receiving elements 111 and 113. The first light emitting element 110 is connected to a first infrared emitting processor 120, which converts an electrical signal supplied from the first infrared emitting processor 120 into an infrared signal and irradiates it on a left side of an object 100. And, the second light emitting element 112 is connected to a second infrared emitting processor 121 which converts an electrical signal supplied from the second infrared emitting processor 121 into an infrared signal an irradiates it on the right side of the object 100. Here, the first and second light emitting elements 110 and 112 comprise infrared diodes, respectively, and the electrical signal generated in the first and second infrared emitting processors 120 and 121 becomes a driving voltage for driving the infrared diodes. The first and second light emitting elements 110 and 112 are mounted on the front surface of the camcorder (not shown) provided with a lens, so that the infrared regions on the object irradiated by the first and second light emitting elements 110 and 112 overlap to the extent of one-third of their common region. Meanwhile, a first light receiving element 111 receives an infrared signal from the first light emitting element 110 reflected by the object 100 and supplies it to an infrared receiving procesor 130. And, the second light receiving element 113 receives an infrared signal from the second light emitting element 112 reflected by the object 100 and suppies it to a second infrared receiving processor 131. The first and second light receiving elements 111 and 113 are provided beside the first and second light emitting elements 110 and 112, respectively. The first infrared receiving processor 130 converts an infrared signal from the first light receiving element 11 into an electrical signal, and the second infrared receiving processor 131 also converts an infrared signal from the second light receiving element 113 into an electrical signal. To do this, each of the infrared receiving processors 130 and 131 comprises an infrared light receiving element, and the electrical signals generated in the infrared receiving processors 130 and 131 will be a voltage or current.

The object tracking apparatus for the camcorder comprises a first preamplifier 140 connected to the first infrared receiving processor 130 and a second preamplifier 141 connected to the second infrared receiving processor 131. The first and second preamplifiers 140 and 141 amplify the electrical signals supplied from the first and second infrared receiving processors 130 and 131, respectively, by a predetermined amplification rate, and supply the amplified electrical signals to first and second detectors 150 and 151, respectively. The first detector 150 generates an integrated electrical signal having an average value by low-pass filtering the electrical signal amplified in the first preamplifier 140. The second detector 151 also generates an integrated electrical signal having an average value by low-pass filtering the electrical signal amplified in the second preamplifier 141.

Also, the object tracking apparatus for the camcorder additionally comprises first and second comparators 160 and 161 which compare the outputs of the first and second detectors 150 and 151 with a predetermined reference value, respectively, and drive a motor according to the compared result. Between them, the first comparator 160 generates a motor driving signal of a specific logic (high or low) state for driving a motor 180 forward and supplies it to a first motor driver 170, when the integrated electrical signal value supplied from the first detector 150 is greater than a predetermined reference value (i.e. when the object moves to the right side). The motor driver 170 drives the motor 180 in a forward direction by the motor driving signal of a specific logic state supplied from the first comparing portion 160. On the other hand, the second comparator 161 also generates a motor driving signal of a specific logic (high or low) state for driving the motor 180 into a backward direction and supplies it to a second motor driver 171, when the integrated electrical signal value supplied from the second detector 151 is greater than a predetermined reference value (i.e., when the object moves to the left side). The second motor driver 171 drives the motor 170 backward by the motor driving signal of the specific logic state from the second comparator 161.

Figure 7:
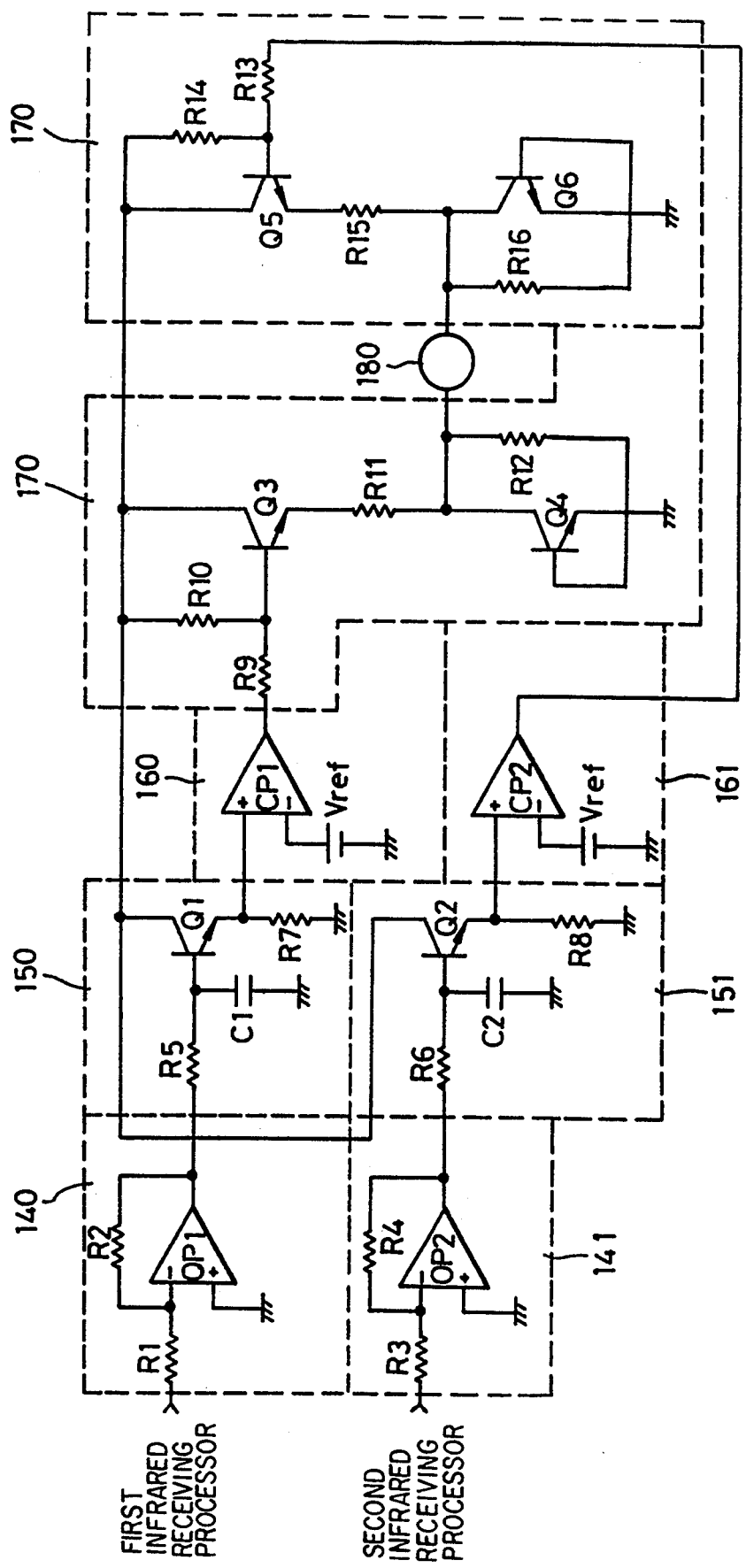
FIG. 7 is a circuit diagram which depicts in detail first and second preamplifiers, first and second detectors, first and second comparing means, and first and second motor drivers as shown in FIG. 6.

With reference to FIG. 7, the first and second preamplifiers 140 and 141, the first and second detectors 150 and 151, the first and second comparator 160 and 161, and the first and second motor drivers 170 and 171, as shown in FIG. 6, will be described in detail. Referring to FIG. 7, the first amplifier 140 is an inverted operational amplifier which is composed of a first operational amplifier OP1 having a feedback resistor R2 connected between an inverted terminal and an output terminal thereof and a resistor R1 connected between the inverted terminal thereof and the output terminal of the first infrared receiving processor 130, and amplifies the output of the first infrared receiving processor 130 by an amplification rate of $-(R2/R1)$. The first detector 150 for integrating the electrical signal amplified by the operational amplifier OP1 comprises an R-C integrator having a resistor R5 and a capacitor C1 connected in series between the output terminal of the first operational amplifier OP1 and a second power source GND, and a buffer circuit composed of a first transistor Q1 whose base is connected to the connection of the resistor R5 and the capacitor C1 and whose collector is connected to a first power source Vcc and a resistor R7 connected between the emitter of the transistor Q1 and the second power source GND. Here, the R-C integrator integrates the output of the first operational amplifier OP1 and supplies the integrated signal to a non-inverted terminal of the first comparator CP1 through the buffer circuit. The first comparator CP1 constituting a first comparing portion 160 with a first reference voltage source Vref1 connected to its non-inverted terminal compares an emitter voltage of the first transistor Q1 with a reference voltage of the first reference voltage source Vref1 to generate a motor driving signal. The motor driving signal has a high logic only when the emitter voltage of the transistor Q1 is greater than the reference voltage Vref1 (i.e., only when the object moves to its right side).

Further, the second preamplifier 141 having two resistors R3 and R4 and a second operational amplifier OP2, the second detector 151 comprising two resistors R6 and R8, a capacitor C2 and a transistor Q2, and the second comparing portion 161 having a second reference voltage source Vref2 and the second comparator CP2 have the same form and function as the first preamplifier 140, the first detector 150, and the first comparing portion 160, respectively. As a result, the second comparing portion 161 generates a motor driving signal having a high logic when the object moves to the left side.

Also, the first motor driver 170 driven by the motor driving signal from the first comparator CP1 comprises a third transistor Q3 which is turned on by the motor driving signal of high logic from the first comparator CP1 to its base through a resistor R9, thereby supplying the first power source Vcc connected to its collector with one terminal of the motor 180 via its emitter and a resistor R11. The first motor driver 170 comprises a fourth transistor Q4 whose collector is connected to the other terminal of the motor 180 and whose emitter is connected to the second power source GND. The fourth transistor Q4 is turned on by a voltage at the first terminal of the motor 180 applied to its base via a resistor R12, thereby connecting the second terminal of the motor 180 to the second power source GND via its collector and emitter. A resistor R10 connected to the base of the third transistor Q3 and the first power source Vcc is a pull-up resistor.

Meanwhile, the second motor driver 171 for driving the motor 180 backward the motor driving signal of high logic from the second comparator CP2 comprises a fifth transistor Q5 whose base is connected to the output terminal of the second comparator CP2 via the resistor R13. The fifth transistor Q5 is turned on by the motor driving signal of high logic from the second comparator CP2, thereby supplying the first power source vcc connected to its collector with the second terminal of the motor 180 via the emitter and resistor R15. Also, the second motor driver 171 additionally comprises a sixth transistor Q6 whose collector is connected to the first terminal of the motor 180 and whose emitter is connected to the second power source GND. The sixth transistor Q6 is turned on by the voltage at the second terminal of the motor 180 applied to its base via a resistor R16, and connects the first terminal of the motor 180 to the second power source GND via its collector and emitter. Similarly, a resistor R14 connected between the base of the fifth transistor Q5 and the first power source Vcc is a pull-up resistor.

As a result, when a motor driving signal of high logic is generated in the first comparator CP1 (i.e., when an object moves into the right side), the first motor driver 170 supplies the first power source Vcc with the first terminal of the motor 180 via the collector and emitter of the third transistor Q3 and the resistor R11, and the second supply power GND with the second terminal of the motor 180 through the emitter and collector of the fourth transistor Q4, thereby driving the motor 180 forward (counterclockwise). On the other hand, when a motor driving signal of high logic is generated in the second comparator CP2 (i.e., when an object moves to the left side), the second motor driver 171 supplies the first power source Vcc with the second terminal of the motor 180 via the collector and emitter of the fifth transistor Q5 and also connects the first terminal of the motor 180 to the second power source GND via the collector and emitter of the transistor Q6, thereby driving the motor 180 backward (i.e., clockwise).

Figure 8:
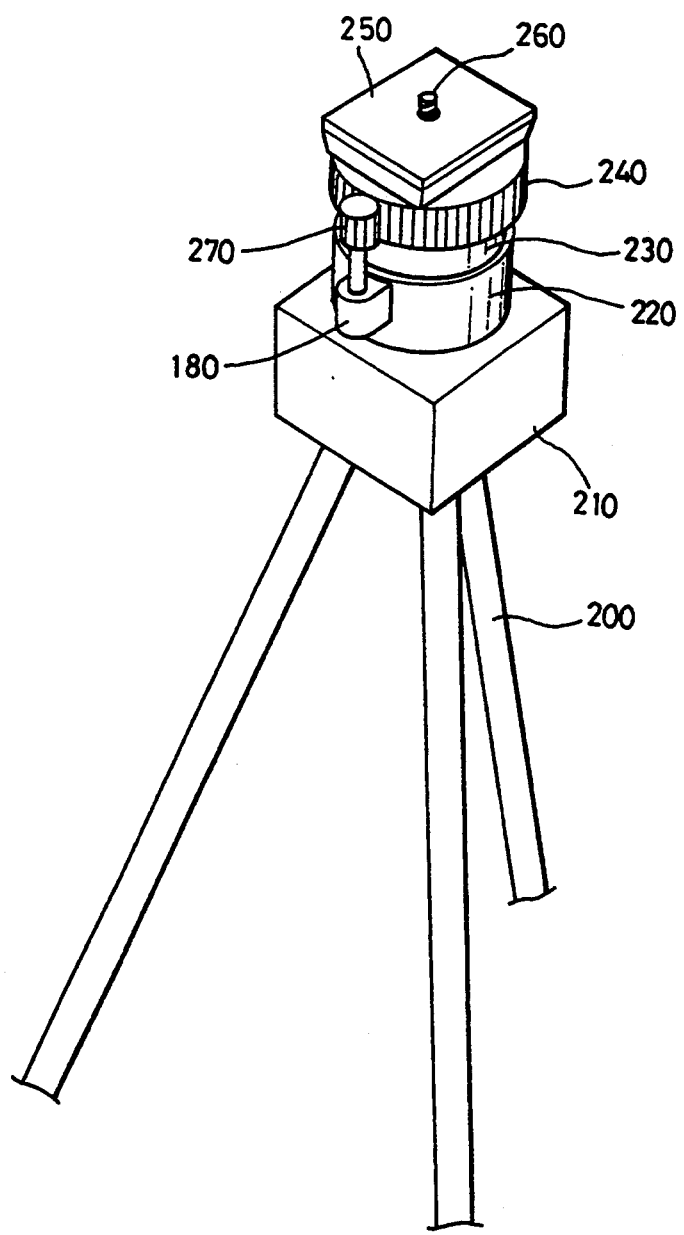
FIG. 8 is a perspective diagram of the camcorder supporting apparatus driven by the motor shown in FIG. 8.

FIG. 8 illustrates a camcorder supporting apparatus for panning the photographing direction of the camcorder left and right by the motor shown in FIG. 6. The camcorder supporting apparatus shown in FIG. 6 comprises a tripod 200 for positioning the camcorder to a predetermined height. A supporting structure 210 having a cylindrical case 220 is mounted on the upper portion of the tripod 200. The cylindrical case 220 inserts the rotational axis 230 rotatably. The cylindrical case 220 has a motor 180 mounted on the circumferential surface. A motor gear 270 is fixed in the rotational axis of the motor 180.

Further, the camcorder supporting apparatus comprises a power transmission gear 240 fixed in the upper portion of the rotational axis 230 to engage with the motor gear 270. A fixing plate 250 having a bolt 260 for fixing the camcorder to its center is mounted on the upper surface of the power transmission gear 240.

The camcorder supporting apparatus constituted as described above pens left and right the photographing direction in the camcorder as the motor 180 rotates in the forward and backward directions. First, when the motor 180 rotates forward (i.e., counterclockwise) (i.e., when the object moves to the right side), the motor gear 270 rotates counterclockwise by the rotational force of the motor 180. The power transmission gear 240 engaged with the motor gear 270 is rotated counterclockwise with the fixing plate 250 and rotational axis 230 by the rotational force of the motor gear, thereby rotating the photographing direction in the camcorder in the right side.

To the contrary, when the motor 180 rotates backward (i.e. clockwise), (i.e., when the object moves to the left side), the motor gear 270 rotates clockwise by the rotational force of the motor 180, thereby rotating the power transmission gear 240, the fixing plate 250, and the rotational axis 230 counterclockwise. Accordingly, the photographing direction (i.e., the lens portion) of the camcorder is rotated to the left side according to the rotation of the power transmission gear 240.

As described above, the present invention has advantages in that the moving direction of the object is detected by using a photosensitive element to pan the camcorder according to the detected object's moving direction so the camcorder can automatically track and photograph the moving object. Moreover, since the camcorder continuously tracks the moving object, the present invention has advantages in that the object's tilting to one side of the screen can be prevented.

While the present object tracking apparatus has been described with reference to an embodiment illustrated in FIGS. 6 to 8, it is to be understood that modifications will be apparent to those skilled in the art without departing from the spirit of the invention.

Also, the supporting apparatus shown in FIG. 8 is constructed to rotate the camcorder up and down instead of rotating it right and left and the photosensitive element shown in FIG. 6 detects the movement of the object in the upward and downward directions, the camcorder can be panned up and down according to the upward and downward displacements of the object. Accordingly, the aforementioned embodiment is provided only for describing the present invention, and it is understood that the invention is not limited to the specific embodiments thereof and is to be determined solely by the following claims.

What is claimed is:

1. An object tracking apparatus for a camcorder comprising:
   first supporting means for supporting the camcorder to be panned to the right and left;
   a motor for supplying mechanical power to said first supporting means such that said first supporting means pans the camcorder to the right and left;
   positioning means for positioning the camcorder at a predetermined height;
   second supporting means, disposed between the positioning means and the first supporting means, for supporting said motor;
   motor driving means for driving the motor so as to rotate said first supporting means to the right or the left;
   first and second infrared wave emitting means, respectively mounted in front of the camcorder, for emitting infrared wave beams with the projected regions of the infrared wave beams being partially overlapped with each other;
   first and second infrared wave receiving means, mounted in front of the camcorder, for detecting the quantity of the infrared wave beams reflected from an object, respectively;

a first detecting means for integrating an output of said first infrared wave receiving means;

a second detecting means for integrating an output of said second infrared wave receiving means;

a first comparing means for comparing an output signal of said first detecting means with a predetermined reference value to detect movement of said object to the right and control said motor driving means to selectively rotate said first supporting means to the right; and a second comparing means for comparing an output signal of said second detecting means with a predetermined reference value to detect movement of said object to the left and control said motor driving means to selectively rotate said first supporting means to the left.

2. An object tracking apparatus for a camcorder as set forth in claim 1, wherein each of said first and second detecting means comprises:

low-pass filtering means for low-pass filtering an output of one of said first and second infrared wave receiving means; and a buffer circuit for buffering and amplifying an output of said low-pass filtering means.

3. An object tracking apparatus for a camcorder as set forth in claim 1, wherein said motor driving means comprises:

first control switch means for switching a first power source to a first terminal of said motor by an output signal of said first comparing means; and second control switch means for switching a second power source to a second terminal of said motor by a potential at the first terminal of said motor.

4. An object tracking apparatus for a camcorder as set forth in claim 3, wherein said motor driving means further comprises:

third control switch means for switching a first power source to the second terminal of said motor by an output signal of said second comparing means; and fourth control switch means for switching a second power source to the first terminal of said motor by a potential at the second terminal of said motor.

5. An object tracking apparatus for a camcorder as set forth in claim 4, wherein each of said first to fourth control switch means includes a transistor.

6. An object tracking apparatus for a camcorder as set forth in claim 4, wherein said first power source has a high potential (Vcc) and said second power source has a low potential (GND).

7. An object tracking apparatus for a camcorder as set forth in claim 1, wherein said first and second infrared wave receiving means include processors for generating signals, respectively.

8. An object tracking apparatus for a camcorder as set forth in claim 1, wherein an infrared region on the object irradiated by said first infrared wave emitting means overlaps by one-third with an infrared region on the object irradiated by said second infrared wave emitting means.

9. An object tracking apparatus for a camcorder as set forth in claim 1, wherein said second supporting means comprises a cylindrical case for fixing said motor on its circumferential surface, a rotational axis is rotatably inserted into said case, said first supporting means comprises a circular power transmission gear fixed on the upper portion of said rotational axis and a fixing plate mounted on the upper portion of said power transmission gear to support the camcorder, and said motor includes a motor gear mounted on the rotational axis of said motor to engage with said power transmission gear.

* * * * *